United States Patent
Koriyama

[11] Patent Number: 5,934,239
[45] Date of Patent: Aug. 10, 1999

[54] PLATED CYLINDER ARRANGEMENT

[75] Inventor: Masao Koriyama, Iwata, Japan

[73] Assignee: Yamaha Hatsudoki Kabushiki Kaisha, Iwata, Japan

[21] Appl. No.: 08/982,834

[22] Filed: Dec. 2, 1997

[51] Int. Cl.$^6$ .................................................. F02F 1/00
[52] U.S. Cl. .................................. 123/193.2; 29/888.061
[58] Field of Search ............................ 123/193.2, 193.3; 29/888.06, 888.061

[56] References Cited

U.S. PATENT DOCUMENTS

| | | |
|---|---|---|
| 5,000,127 | 3/1991 | Nishimura . |
| 5,080,056 | 1/1992 | Kram et al. ........................ 29/888.061 |
| 5,199,166 | 4/1993 | Torigai et al. . |
| 5,520,791 | 5/1996 | Murase . |
| 5,549,086 | 8/1996 | Ozawa et al. . |
| 5,598,818 | 2/1997 | Domanchuk ........................ 123/193.2 |
| 5,619,962 | 4/1997 | Ikegaya et al. . |
| 5,642,700 | 7/1997 | Ikegaya et al. ..................... 29/888.061 |
| 5,647,967 | 7/1997 | Murase et al. . |
| 5,660,704 | 8/1997 | Murase . |
| 5,666,933 | 9/1997 | Koriyama . |
| 5,806,481 | 9/1998 | Ikegaya ............................ 123/193.2 |

FOREIGN PATENT DOCUMENTS

| | | |
|---|---|---|
| 641872 A1 | 8/1995 | European Pat. Off. . |
| 693618 A1 | 1/1996 | European Pat. Off. . |
| 791917 A1 | 7/1996 | European Pat. Off. . |

*Primary Examiner*—Marguerite McMahon
*Attorney, Agent, or Firm*—Knobbe, Martens, Olson & Bear LLP

[57] ABSTRACT

A plated cylinder and method for creating a plated cylinder are disclosed. The cylinder is formed by a cast cylinder block and includes a cylinder wall having one or more casting pits or pores. The casting pits have a maximum dimension which is less than a dimension which is spanned by a plating during a plating process in which plating material is deposited on said wall as said material flows along said wall at a velocity. In the method of producing the plated cylinder, the cylinder wall is inspected to determine the dimension of the casting pits, and if of a small enough dimension, plating is applied in a high speed plating process in which plating material is directed at a velocity along the cylinder wall and deposited thereon, spanning all casting pits.

14 Claims, 3 Drawing Sheets

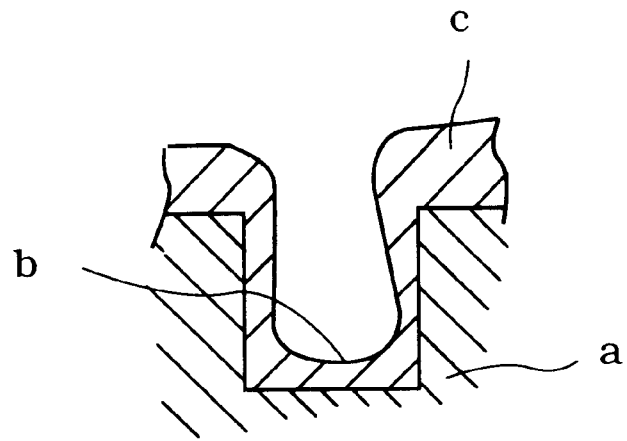
φ 0.2 mm
Figure 1
(Prior Art)
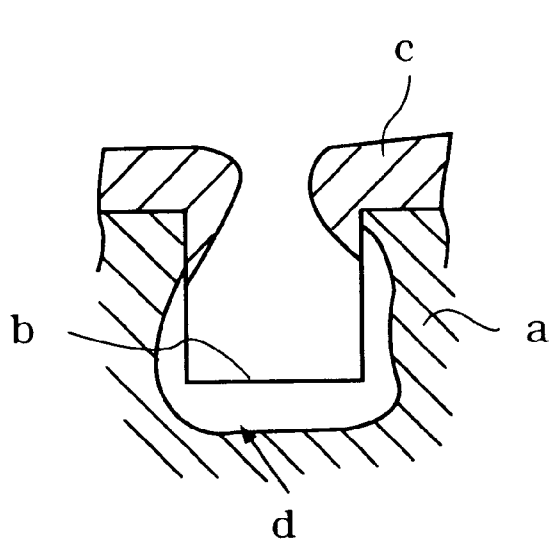 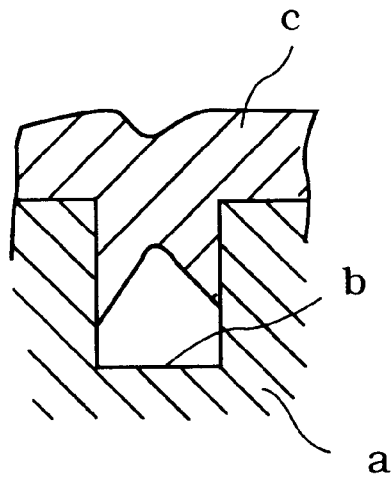
φ 0.2 mm                φ 0.1 mm
Figure 2(a)         Figure 2(b)
(Prior Art)             (Prior Art)

PLATED CYLINDER ARRANGEMENT

FIELD OF THE INVENTION

The present invention relates to an engine having a cylinder block which defines at least one cylinder. More particularly, the invention is cast cylinder block defining a cylinder having a plated cylinder wall.

BACKGROUND OF THE INVENTION

Today a variety of metals are used in the construction of engine components, including the cylinder block and cylinder head. The use of many of these metals, such as aluminum, serves to reduce the total weight of the engine. While many of these metals or alloys have a desirably low mass per unit volume, they may be insufficiently resistant to friction abrasion when used to form parts having relative motion therebetween. For example, the cylinder block may define a cylinder in which a piston reciprocates, the cylinder having an inner surface or wall which is abraded by the piston. Another problem associated with use of these metals or alloys is that they are often susceptible to corrosion or erosion from the oil, fuel and other materials used in the engine.

To protect inner cylinder surfaces, cast iron sleeves (liners) have been installed to make the sliding surface more resistant to abrasion by the piston. These sleeves are heavy, however, and detract from the original goal of creating a lightweight engine.

As a result, one approach to solving the above-stated problems has been to coat or "plate" the sliding surfaces of the engine, such as the inner cylinder surface, with more durable materials such as chrome or nickel. This proposed solution has the advantage that greater durability may be obtained without the weight associated with solutions such as sleeves. On the other hand, plating has several drawbacks and associated problems.

A main problem with plating is associated with casting pits on the surfaces which are to be plated. These pits or holes are generated during the casting process and extend inwardly from the sliding surface of the casting, such as the inner surface of the cylinder. In order to protect the sliding material from erosion and abrasion, as described above, the exposed casting surfaces in these pits must be protected with plating.

As illustrated in FIG. 1, a casting pit b exists in a casting a, such as a cast aluminum cylinder block. When the pit b has a maximum dimension of over about 0.2 mm, it is often difficult to protect the casting surface in the pit in the manner desired. One method of plating which is effective in plating even large dimension pits is to immerse or dip the casting in a plating liquid and apply a differentiating voltage to the casting and liquid. This method is generally effective in creating a plating layer c which extends even into the pit b, covering the casting surfaces defined therein. On the other hand, this method of plating is very slow and is not generally useful when plating in selective locations of the casting is desired.

As a result, methods of high speed plating have been developed. Such high speed plating methods are described in a U.S. Pat. No. 5,647,967 issued Jul. 15, 1997, entitled "Plating Method For Cylinder," U.S. Pat. No. 5,660,704 issued Aug. 26, 1997, entitled "Plating Method and Plating System For Non-homogenous Composite Plating Coating," U.S. Pat. No. 5,520,791 issued May. 28, 1996, entitled "Non-homogenous Composite Plating Coating," U.S. Pat. No. 5,549,086 issued Aug. 27, 1996, entitled "Sliding Contact-Making Structures in Internal Combustion Engine," U.S. Pat. No. 5,619,962 issued Apr. 15, 1997, entitled "Sliding Contact-Making Structures In Internal Combustion Engine," and U.S. Pat. No. 5,666,933 issued Sep. 17, 1997, entitled "Sleeveless Cylinder Block Without Marginal Plating Coating," which are incorporated herein by reference.

In general, in this method a pipe electrode is positioned in the cylinder, the pipe having an outer surface spaced from the inner wall or surface of the cylinder. A voltage is potential is provided between the pipe and cylinder and then plating liquid is delivered in a dispersed substance forming material to the cylinder to or from the pipe. This plating material flows at a relatively high velocity (such as 1 to 7 m/s) along the wall of the cylinder, coating it with plating material.

Use of this high speed plating method is especially effective when the casting pits are less than 0.1 mm in maximum width dimension, as illustrated in FIG. 2(b), in that as the material flows along the inner wall of the cylinder at high speed, the plating material spans or bridges across the opening or top of the pit, effectively sealing the casting surfaces exposed therebelow. As a result, an improved harder sliding surface is provided and the casting surfaces, even in the pit, are protected from corrosion and erosion.

On the other hand, as illustrated in FIG. 2(a), pits having a maximum dimension of over about 0.2 mm are generally not plated. In particular, these larger pits or pores present a stagnation area which is filled with dispersed carrier and then prevents the plating material carried thereby from spanning or filling the void. As such, the exposed casting surface within the pit erodes or corrodes at point d illustrated therein.

A improved plated cylinder and method of creating the same which overcomes the above-stated problems is desired.

SUMMARY OF THE INVENTION

The present invention is a plated cylinder and method for creating a plated cylinder which overcome the above-stated problems.

The cylinder is defined by a cast cylinder block and includes a cylinder wall having one or more casting pits or pores. The casting pits have a maximum dimension which is less than a dimension which is spanned by a plating coating during a high-speed plating process in which plating material is deposited on said wall as the plating material flows along said wall at a velocity.

In the method of producing the plated cylinder, the cylinder wall is inspected to determine the dimension of the casting pits, and if of a small enough dimension, plating is applied in the high speed plating process in which plating material is directed along the cylinder wall at a velocity and deposited thereon, spanning all casting pits.

Further objects, features, and advantages of the present invention over the prior art will become apparent from the detailed description of the drawings which follows, when considered with the attached figures.

BRIEF DESCRIPTION OF THE DRAWINGS

FIG. 1 illustrates a casting having a casting pit and a plating deposited in accordance with a first method of the prior art;

FIG. 2(a) illustrates a casting having a casting pit of a first size with a plating deposited in accordance with a second method of the prior art;

FIG. 2(b) illustrates a casting having a casting pit of a second size with a plating deposited in accordance with the second method of the prior art;

DETAILED DESCRIPTION OF THE PREFERRED EMBODIMENTS OF THE INVENTION

The present invention is a plated, cylinder and a method of plating a cylinder. In general, the cylinder includes casting pits extending in from a cylinder wall, the casting pits covered or bridged by a plating coating applied in a high-speed plating process. In general, the method of plating involves checking or inspecting the size of the casting pits to ensure they are of a small enough size to be bridged by plating is a high-speed plating process and, if so, applying plating in such a process in which plating material is flowed across the cylinder wall of a high velocity. Those of skill in the art will appreciate that the method of the present invention may be adapted to plating of items other than the cylinder walls of a cylinder block casting, such as the inner wall of a combustion chamber of a rotary engine casting or the like.

Figure 3:
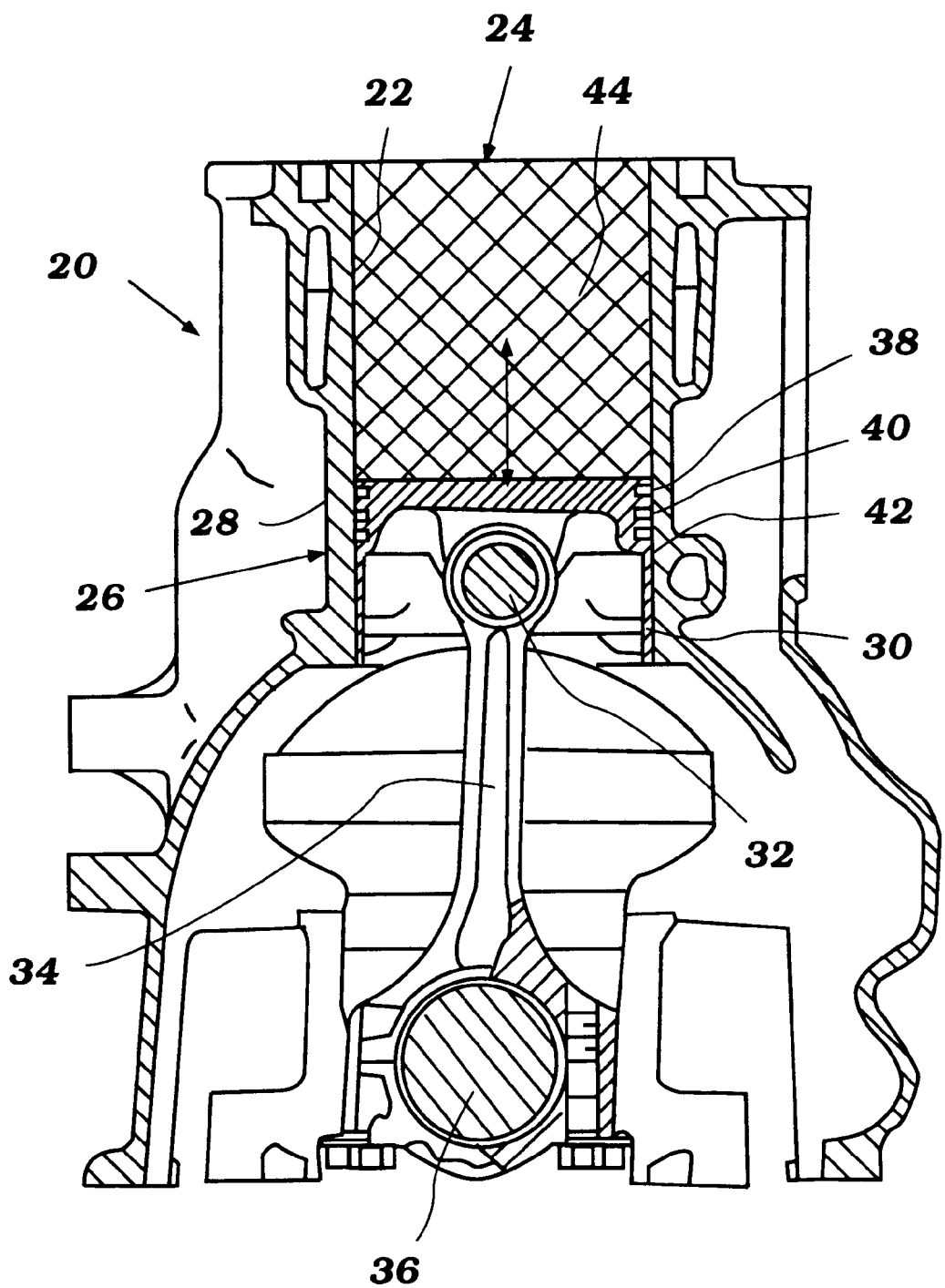
FIG. 3 is a cross-sectional view of a portion of an engine having a cylinder block defining a cylinder, the cylinder having an inner wall plated in accordance with the present invention.

Referring to FIG. 3, the invention is particularly adapted to a cast cylinder block 20 having an inner, generally cylindrical wall 22 which defines a cylinder 24. A piston 26 is slidably mounted in the cylinder 24. The piston 26 has a head or land 28 and skirt portion 30 extending downwardly therefrom. A connecting rod 34 extends between a mounting pin 32 of the piston 26 and a crankshaft 36. During operation of the engine, combustion of fuel within the cylinder above the piston 26 drives the piston downwardly, effectuating rotation of the crankshaft 36, as is well known to those of skill in the art.

To reduce the blow-by of fuel and air from that portion of the cylinder 24 above the head 28 of the piston 26 to a crankcase chamber in which the crankshaft 36 rotates, first and second rings 38,40 are positioned on the outer surface of the piston 26 between the piston and the inner wall or surface 22 defining the cylinder 26. In addition, to prevent the flow of lubricant (oil) into the cylinder and fouling the cylinder 24, an oil ring 42 is similarly positioned on the exterior of the piston 26. These rings and their mounting are well known to those of skill in the art.

The cylinder block 20 is preferably cast from a metal or alloy, such as aluminum. During the casting process, casting voids or pores are formed. These voids are areas of the casting which are not filled with the casting metal or alloy. A number of these voids extend inwardly from the inner surface 22 which defines the cylinder 24, such that they may generally be referred to as "pits."

In accordance with the present invention, the inner wall 22 of the cylinder 24 is plated with a plating layer or coating 44.

Preferably, the plating coating 44 is applied in accordance with a high speed plating method described in more detail below. In accordance with the present invention, however, the plating 44 is not applied unless the casting pits in the inner wall 22 of the cylinder 24 fall within the following parameters.

In general, to ensure that the plating 44 effectively plates the pit areas, the casting pits or pores in the cylinder wall 22 are checked to ensure that they are of a small enough size to be bridged by plating during the high speed plating process.

Figure 4:
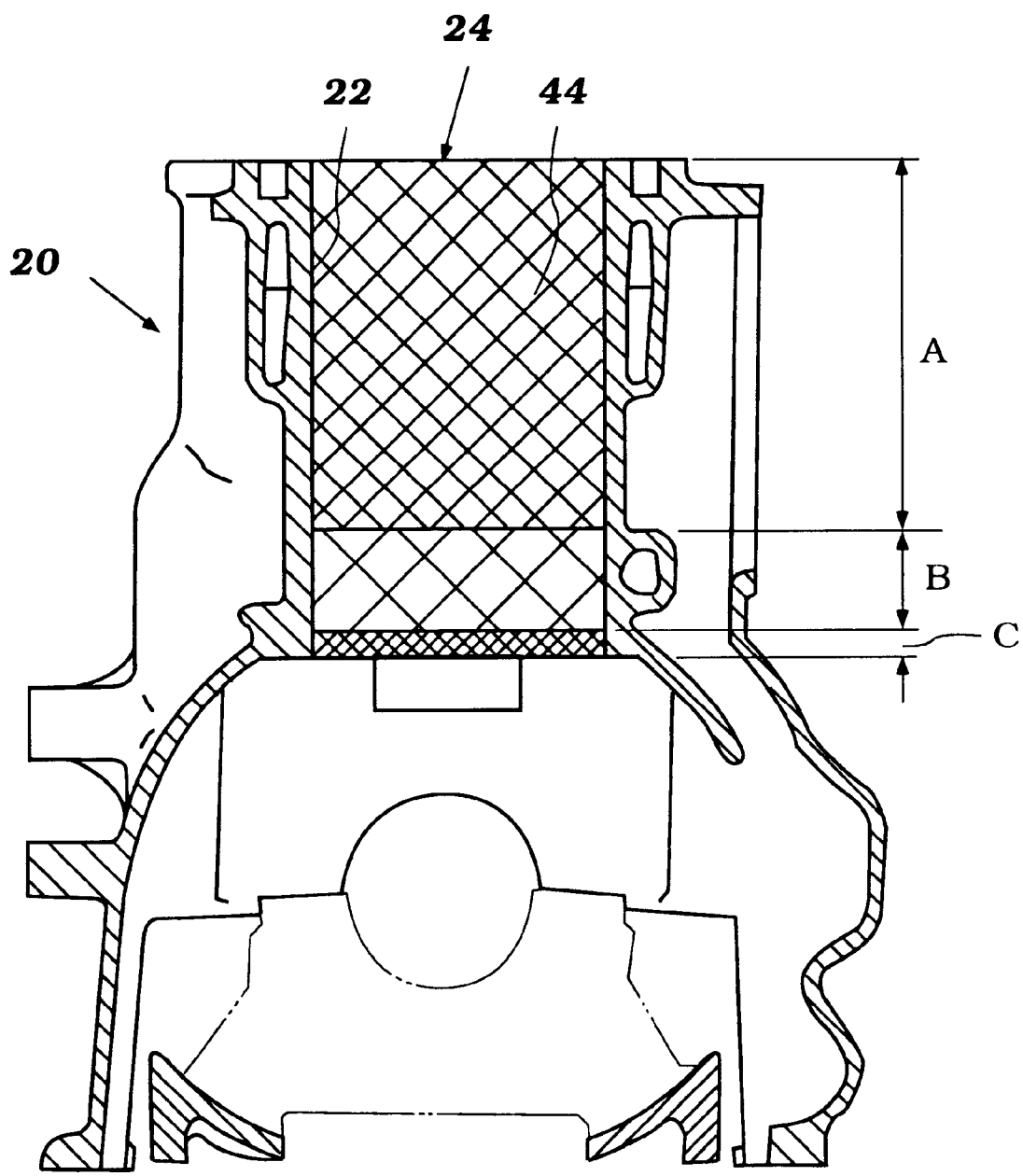
FIG. 4 is a cross-sectional view illustrating a portion of the engine illustrated in FIG. 3, with cylinder plating regions of the present invention superimposed thereon.

Referring to FIG. 4, in a region "A" which extends from a top of the cylinder 24 (i.e. corresponding to the top surface of the cylinder block 20 to which a cylinder head is connected) to a depth of about 101.00 mm. Casting pits located in this region, preferably have a maximum width dimension of no greater than 0.5 mm and maximum depth dimension of no greater than 0.5 mm. The term "maximum width dimension" is generally meant to refer to the maximum distance or span from one edge of the pit to the other in the plane of the inner wall 22. The depth dimension is meant to refer to the dimension of the pit from the plane of the inner wall 22 to the casting material at the bottom of the pit.

In this same region "A" the shortest distance between casting pits is preferably no less than 6 mm. In addition, the number of casting pits positioned on the same circumference is preferably less than 4. In other words, a plane intersecting the inner wall 22 generally perpendicular an axis through the cylinder 24 from the top to bottom end should not intersect more than 4 casting pits on the surface of the wall 22.

In a region "B" which extends downwardly from the termination of region "A" (i.e. about 101.00 mm below the top of the cylinder) to about 132.00 mm from the top of the cylinder 24, the maximum width dimension of the casting pits is preferably no greater than 1.0 mm and the maximum depth is preferably no greater than 0.8 mm. Also, in this region "B" the shortest distance between casting pits is preferably no less than 6.0 mm, and the number of casting pits should be less than 4 per circumference.

In a region "C" which extends downwardly from the termination of region "B" (i.e., about 132.00 mm below the top of the cylinder) to the bottom of the cylinder 24, the maximum width dimension of the casting pits is preferably no greater than 0.5 mm and the maximum depth is preferably no greater than 0.8 mm. Also, in this region "C" the shortest distance between casting pits is preferably no less than 6.0 mm.

The above-described casting pit parameters may be checked with a variety of methods and tools. The casting pit parameters are checked, however, before the plating 44 is applied, to determine whether the plating should be applied at all. In the event the abovedescribed parameters or tolerances are not met, the high speed plating method is preferably not utilized to apply the plating, since such may not result in a properly or entirely plated cylinder.

The cylinder 24 is preferably divided into the three regions "A" "B" and "C" as described above based upon the nature of the sliding contact regions between the piston 26 and cylinder wall 22. In particular, region "A" is generally that region of the cylinder wall 22 which the rings 38,40,42 on the piston 26 engage during the reciprocating motion of the piston. This area is subject to high temperatures and sliding frictional forces, and as such the casting pit parameters are chosen to ensure that plating 44 provides a sufficient protective surface.

The region "B" is the area which generally only the skirt portion 30 of the piston 26 (and not the rings) engages. This area is subject to less extreme conditions, including slightly less sliding forces. As such, in this region the casting pit parameters may be slightly varied and still result in a satisfactory plating 44 to be applied with the high speed casting process.

Region "C" is a seal or boundary region at the bottom of the cylinder 24. In this area, it must be ensured that the plating 44 seals to the cylinder wall 22 to prevent its being rubbed or scaled away in this area, since if this occurs, it may result in excessive degradation or wear of the plating 44 moving in a direction vertically up along the cylinder wall 22. This is due to the fact that when the piston 26 is subject to lateral forces which cause it to press against the lowermost portion of the cylinder wall 22 with a high force, and thus subjecting the plating 44 in this area to similar forces.

Of course, the cylinder 24 need not be divided into such regions. Also, the particular parameters described above, while preferred, may be varied, as long as the casting pit dimensions are such that the pit(s) are bridges or spanned by the plating in the plating process.

As stated above, if the casting pits fall within the tolerances in the regions described above, the plating 44 is applied with the high speed plating method. This method is described in detail in a U.S. Pat. No. 5,647,967 entitled "Plating Method For Cylinder," which is incorporated herein by reference. This plating may be a non-homogenous composite plating formed with a high speed plating method as described in a U.S. Pat. No. 5,520,791 issued May. 28, 1996, entitled "Non-homogenous Composite Plating Coating," and U.S. Pat. No. 5,660,704 issued Aug. 26, 1997, entitled "Plating Method and Plating System for Non-homogenous Composite Plating Coating," which are also incorporated by reference herein.

In addition, the plating deposited on the inner wall 22 may also be a plating formed in a limited area with such a method as described in U.S. Pat. No. 5,666,933 issued Sep. 17, 1997 entitled "Sleeveless Cylinder Block Without Marginal Plating Coating" and incorporated herein by reference. The plating 44 may also have a plating coating finished by a fine honing treatment or plateau honing treatment as well as a piston with a piston ring covered with a vapor deposition layer, as detailed in U.S. Pat. No. 5,549,086 issued Aug. 27, 1996, entitled "Sliding Contact-Making Structures In Internal Combustion Engine" and also incorporated herein by reference. The plating thickness may also be tapered, as disclosed in U.S. Pat. No. 5,619,962 issued Apr. 15, 1997, entitled "Sliding Contact-Making Structures in Internal Combustion Engine," incorporated herein by reference.

As described therein, this plating method involves flowing a plating material in a dispersoid material (such as water containing SiC) across the cylinder wall at a high velocity, such as 1–7 m/s. The plating material deposits in a coating over the cylinder wall 22, and bridges the casting pits.

In one variation of the present invention, the plating coating 44 may be applied over a sleeve which is inserted into the cylinder 24. In this arrangement, a thinner than normal sleeve may be used than when only a sleeve without plating is used, thereby lessening the weight associated therewith. Such a sleeve arrangement with plating may be desirable when a sleeve consisting of a different material than that of the cylinder block or plating is desired.

As is known, such sleeves define an inner wall which may have pits or pores extending therein just as with the cylinder wall of the casting itself. Therefore, before a plating coating 44 is applied to the inner wall defined by the cylinder, the pores or pits therein preferably meet the above-described limitations or the plating coating is not applied.

Of course, the foregoing description is that of preferred embodiments of the invention, and various changes and modifications may be made without departing from the spirit and scope of the invention, as defined by the appended claims.

What is claimed is:

1. A cast cylinder block defining at least one cylinder having a cylinder wall, said cylinder wall containing at least one casting pit extending inwardly therefrom, said at least one casting pit having a maximum dimension which is less than a dimension which is spanned by a plating during a plating process in which plating material is deposited on said wall as said material flows along said wall at a velocity.

2. The cylinder in accordance with claim 1, wherein said maximum dimension of said casting pit is 0.1 mm.

3. The cylinder in accordance with claim 1, wherein said cylinder has a top end and a bottom end and said cylinder is divided into a first, a second and a third region, said first region positioned at said top end of said cylinder, said third region positioned at said bottom end of said cylinder, and said second region positioned between said first and second regions, said at least one casting pit in said first region having a maximum dimension of 0.5 mm, said at least one casting pit in said second region having a maximum dimension of 1 mm, and said at least one casting pit in said third region having a maximum dimension of 0.8 mm.

4. The cylinder in accordance with claim 1, wherein said cylinder wall is cylindrical in shape and wherein no more than four casting pits are positioned along a circumferential line extending about said cylinder.

5. The cylinder in accordance with claim 1, wherein said casting pits are no less than 6 mm apart.

6. The cylinder in accordance with claim 1, wherein said cylinder wall is defined by an inner surface of a sleeve positioned in said block.

7. A method for producing a plated cylinder comprising the steps of casting a cylinder block defining at least one cylinder having a cylinder wall, inspecting said cylinder wall to ensure that said cylinder wall has no pits extending therefrom having a maximum dimension which is greater than a maximum dimension which will be spanned by a plating applied by flowing a plating material along said wall in a high speed plating process, and if so, applying a plating to said cylinder wall in said high speed plating process.

8. The method in accordance with claim 7, wherein said applying step includes the steps of flowing plating along said cylinder wall between about 1 and 7 m/s and depositing plating on said cylinder wall and across said casting pits.

9. The method in accordance with claim 7, wherein said cylinder has a top end and a bottom end and further including the step of dividing said cylinder into first, second and third regions, said first region located near said top end of said cylinder, said third region located at said bottom end of said cylinder, and said second region located between said first and second regions.

10. The method in accordance with claim 9, wherein said step of inspecting comprises determining if said casting pits in said first region having a maximum dimension of 0.5 mm, said casting pits in said second region having a maximum dimension of 1 mm, and said casting pits in said third region having a maximum dimension of 0.8 mm.

11. A method for producing a plated cylinder comprising the steps of casting a cylinder block having at least one cylinder with a cylinder wall and having at least one casting pit in said wall, said cylinder having a top end and a bottom end, dividing said cylinder into at a first and a second region between said top end and bottom end, determining if a size of said casting pit in said first region is within a first tolerance and determining if a size of said casting pit in said second region is within a second tolerance and if so, applying a plating to said cylinder wall.

12. The method in accordance with claim 11, wherein said step of determining comprises the step of measuring a size of said casting pit.

13. The method in accordance with claim 11, wherein said step of applying comprises the step of flowing a plating material along said casting wall at a high velocity.

14. The method in accordance with claim 11, wherein said first and second tolerances are different.

* * * * *